Jan. 21, 1941.   J. STEVENSON   2,229,196
GRASS EXTERMINATOR
Filed Feb. 1, 1940   3 Sheets-Sheet 1

John Stevenson
INVENTOR.

BY
ATTORNEYS.

Jan. 21, 1941.  J. STEVENSON  2,229,196
GRASS EXTERMINATOR
Filed Feb. 1, 1940  3 Sheets-Sheet 2
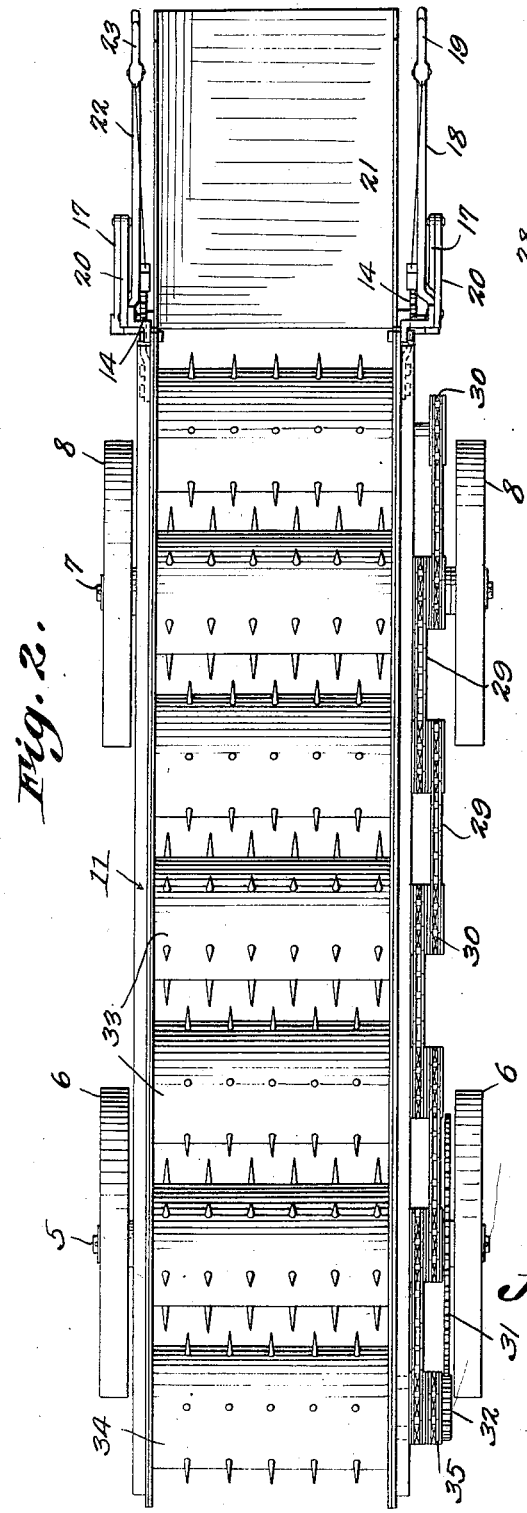
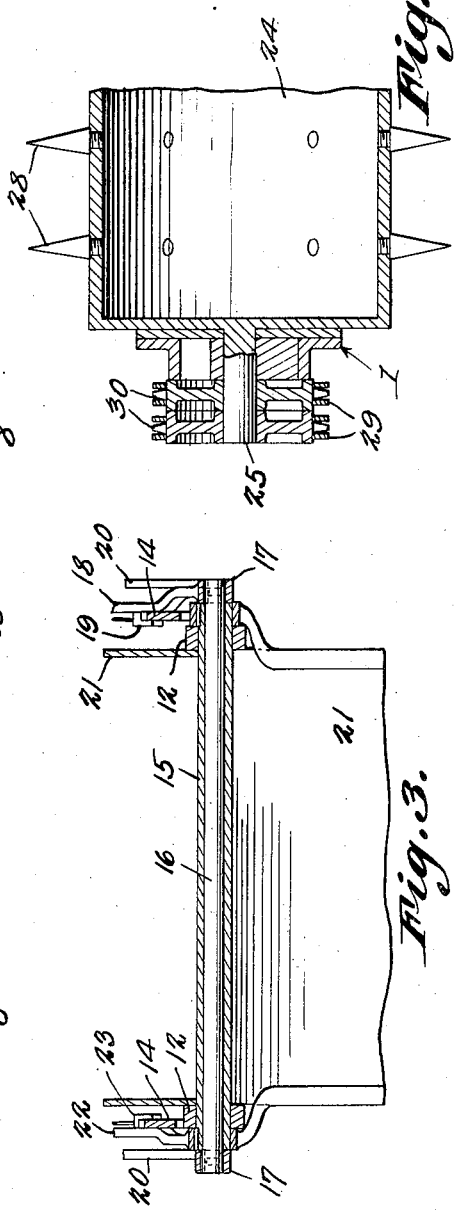
John Stevenson
INVENTOR.
BY CA Snow & Co.
ATTORNEYS.

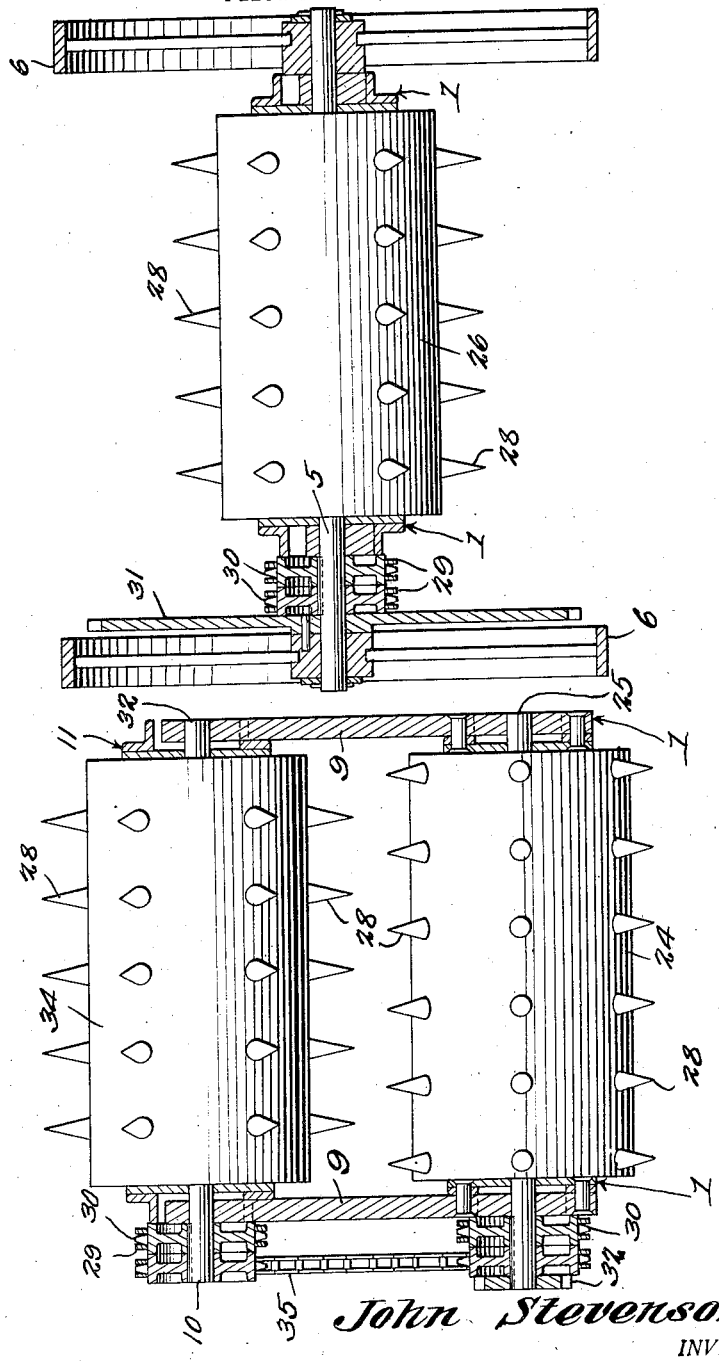

Patented Jan. 21, 1941

2,229,196

UNITED STATES PATENT OFFICE 2,229,196

GRASS EXTERMINATOR

John Stevenson, Fresno, Calif.

Application February 1, 1940, Serial No. 316,823

3 Claims. (Cl. 97—10)

In many regions there is a sturdy and troublesome plant pest, known as Berumda grass, which is difficult to eradicate, inasmuch as it is deep-rooted, a small root portion being vital to start a new plant. The present invention aims to provide a simple but effective machine which will break up chunks of Bermuda grass turf, permitting the dirt to fall to the ground, the Bermuda grass being segregated from the dirt, for destruction.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Fig. 2 is a top plan;

Fig. 3 is a cross section on the line 3—3 of Fig. 1;

Fig. 4 is a transverse section showing one of the rollers and attendant parts (line 4—4, Fig. 1);

Fig. 5 is a section on the line 5—5 of Fig. 1;

Fig. 6 is a section on the line 6—6 of Fig. 1.

Figure 1:
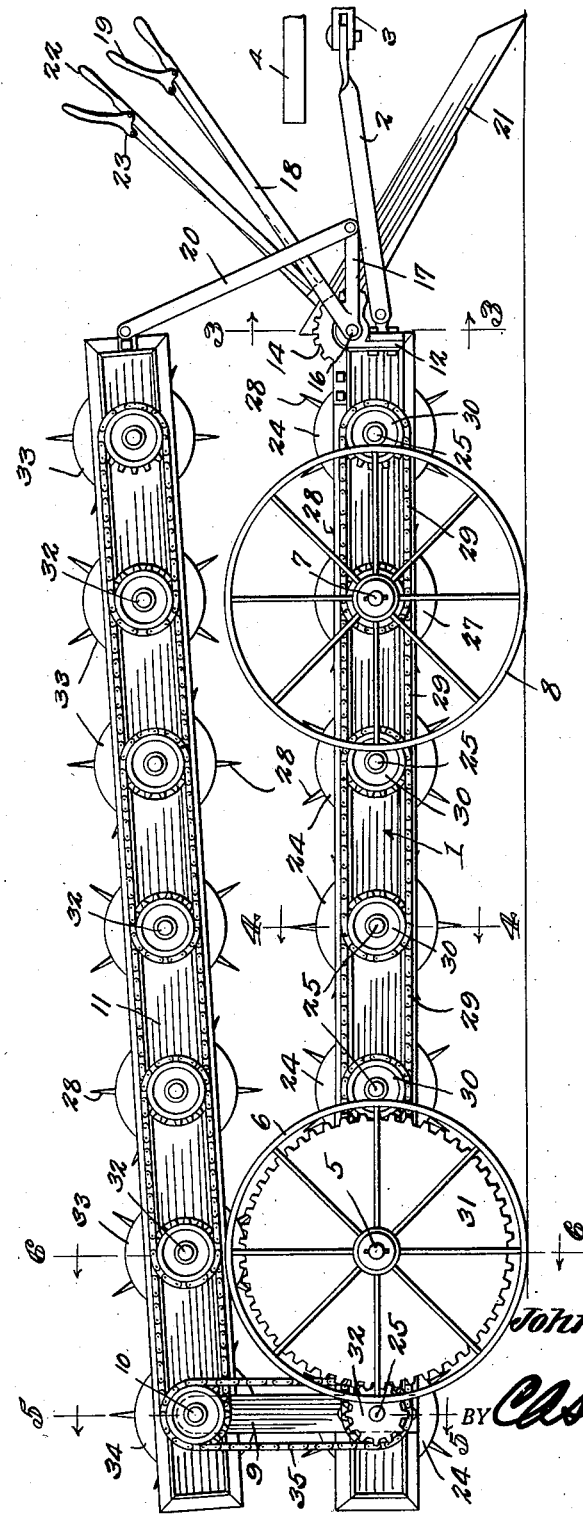
Fig. 1 shows, in side elevation, a machine constructed in accordance with the invention.

The machine forming the subject matter of this application comprises a lower or main frame 1, adapted to be joined by a connecting means 2 to a tractor 3, the platform whereof is marked by the numeral 4.

A rear axle 5 is journaled in the main frame 1, as best shown in Fig. 6, rear ground wheels 6 being mounted to turn on the axle 5. A front axle 7 is journaled in the main frame 1, and forward ground wheels 8 turn on the front axle 7.

It appears in Figs. 1 and 5 that vertical standards 9 are secured at their lower ends to the main frame 1, at the sides thereof and near the rear end of the main frame. A shaft 10 is mounted to turn in the standards 9.

The shaft 10 forms a pivotal mounting for an auxiliary or upper frame 11, which is extended forwardly above the main frame 1. The frames 1 and 11 carry instrumentalities which break up sections of Bermuda grass turf, and it is desirable to adjust the upper frame 11 vertically, to admit turf clods of different sizes, and to effect a crushing of the clods, and the freezing of the Bermuda grass, as the clods travel rearwardly.

The means for adjusting the auxiliary frame 11 up and down on the shaft 10 includes brackets 12 which are secured to the forward portion of the main frame, as Fig. 3 shows, when considered in connection with Fig. 1, the brackets including segments 14. A tubular shaft 15 is mounted to rock in the brackets 12, and an inner shaft 16 is mounted to rock in the tubular shaft.

Crank arms 17 are secured to the inner shaft 16, and project forwardly. At one side of the machine, a hand lever 18 is joined to the shaft 16, along with one crank arm 17. The hand lever 18 carries a latch mechanism 19, cooperating with one of the segments 14. The lower ends of links 20 are pivoted to the forward ends of the crank arms 17, the upper ends of the links being pivotally assembled with the forward end of the upper frame 11.

Through the instrumentality of the hand lever 18, the shaft 16, the crank arms 17, and the links 20, the auxiliary frame 11 can be swung upwardly or downwardly, at the will of an operator, on the shaft 10 that is carried by the standards 9.

The numeral 21 designates a downwardly and forwardly extended chute, which receives the clods of Bermuda grass. The tubular shaft 15 of Fig. 3 forms part of the chute 21. A hand lever 22 is secured to the shaft 15, on the opposite side of the machine from the hand lever 18, and the hand lever 22 carries a latch mechanism 23, cooperating with the corresponding segment 14.

By way of the hand lever 22 and the shaft 15, the chute 21 may be swung up and down, the hand levers 22 and 18 being readily accessible from the tractor platform 4.

A plurality of lower rollers 24 are located within the lower frame 1 and have stub shafts 25 (Fig. 4) journaled in that frame. Figure 6 shows that a lower roller 26 is secured to the rear axle 5, and Figure 1 shows that a lower roller 27 is secured the forward axle 7. All the lower rollers 24—26—27 have teeth 28, and the upper rollers (to be described hereinafter) also are toothed.

The lower shafts 25 and the axles 7 and 5 are rotated by sprocket chains 29, and sprocket wheels 30 secured to the shafts 25 and to the axles 7 and 5. Here recall that the ground wheels 6 and 8 are not fast to the axles 5 and 7, respectively, and consequently the axles do not participate in the clockwise rotation of the ground wheels.

It is shown in Fig. 6 that a large bull gear 31 is secured to one of the rear ground wheels 6. The gear 31 meshes with a reversing pinion 32 secured to the rearmost stub shaft 25. When the said rear ground wheel 6 is rotated, the bull gear 31 rotates the pinion 32 and the rearmost shaft 25, all of the shafts 25, the axle 5 and the axle 6, together with all of the lower drums 24, 26 and 27 being rotated counterclockwise. Since the aforesaid drums or rollers rotate counterclockwise, they receive the clods that ascend the chute 21, and pass the clods backwardly.

A plurality of upper shafts 32 are journaled in the upper frame 11, and carry toothed upper rollers 33. The rearmost shaft 10 in the upper frame 11 carries an upper roller 34. A chain and sprocket drive 35 imparts rotation from the rearmost lower shaft 25 to the shaft 10, the upper shafts 32, and to the rollers 33 and 34. The rollers 33 and 34 receive a counterclockwise rotation.

The upper frame 11 is adjusted vertically at its forward end, by means of the hand lever 18 and associated parts, so that Bermuda grass clods of any desired size may be received between the main frame 1 and the auxiliary or upper frame 11. The lower rollers 24, turning counterclockwise, carry the clods backwardly. The upper rollers 33 and 34 rotate counterclockwise, but their lower portions move forwardly, whereas the upper portions of the lower rollers 24 etc. move rearwardly. The result is that the upper rollers 33—34 comb and break up the clods, freeing the Bermuda grass from the dirt. As the clods move backwardly, they are broken up by the pressure exerted between the upper rollers 33 and 34 and the lower rollers, such as the rollers 24. The dirt in the clods will drop downwardly between the lower rollers, and the Bermuda grass will be carried backwardly, out of the rear end of the machine, to be deposited in a windrow, which can be collected in any suitable way.

Although the rotating parts are driven by the bull gear 31 on one of the ground wheels 6, they might be rotated in some other way.

The machine will be found thoroughly advantageous for ridding the soil of deep-rooted and objectionable vegetation, such as Bermuda grass.

The soil generally is prepared by plowing, and by slicing into clods through the instrumentality of colters or the like.

What is claimed is:

1. A machine for ridding the soil of Bermuda grass comprising a lower frame, a ground wheel journaled on the lower frame, an upper frame disposed above the lower frame, means for mounting the rear portion of the upper frame pivotally, to permit the upper frame to be adjusted vertically, toothed lower rollers journaled on the lower frame, toothed upper rollers journaled on the upper frame, mechanism for rotating all of the rollers, to cause the upper portions of the lower rollers to travel backwardly, and to cause the lower portions of the upper rollers to travel forwardly, and means under the control of an operator for adjusting the upper frame vertically on its aforesaid mounting.

2. A machine for ridding the soil of Bermuda grass, constructed as set forth in claim 1, in combination with means for actuating said mechanism from the ground wheel.

3. A machine for ridding the soil of Bermuda grass, constructed as set forth in claim 1, in combination with a forwardly-extended and downwardly-inclined soil-receiving chute pivoted to the lower frame and leading to the lower rollers, and means for adjusting the chute, to vary its inclination.

JOHN STEVENSON.